United States Patent
Jetzinger et al.

(10) Patent No.: US 9,340,216 B2
(45) Date of Patent: May 17, 2016

(54) DOOR LEAF FOR A VEHICLE, PARTICULARLY A RAIL VEHICLE

(71) Applicant: KNORR-BREMSE GESELLSCHAFT MIT BESCHRÄNKTER HAFTUNG, Mödling (AT)

(72) Inventors: Peter Jetzinger, Amstetten (AT); Thomas Witzelnig, Biberbach (AT); Andreas Mair, Oberschlierbach (AT)

(73) Assignee: KNORR-BREMSE GESELLSCHAFT MIT BESCHRANKTER HAFTUNG, Modling (AT)

( * ) Notice: Subject to any disclaimer, the term of this patent is extended or adjusted under 35 U.S.C. 154(b) by 0 days.

(21) Appl. No.: 14/764,333

(22) PCT Filed: Jan. 30, 2014

(86) PCT No.: PCT/EP2014/051828
§ 371 (c)(1),
(2) Date: Jul. 29, 2015

(87) PCT Pub. No.: WO2014/118292
PCT Pub. Date: Aug. 7, 2014

(65) Prior Publication Data
US 2015/0367864 A1    Dec. 24, 2015

(30) Foreign Application Priority Data

Jan. 31, 2013 (DE) .......................... 10 2013 100 977

(51) Int. Cl.
*E04C 2/00* (2006.01)
*B61D 19/02* (2006.01)
(Continued)

(52) U.S. Cl.
CPC ................. *B61D 19/02* (2013.01); *B60J 5/062* (2013.01); *E06B 3/26301* (2013.01); *E06B 5/00* (2013.01)

(58) Field of Classification Search
CPC ...... B61D 19/02; B61D 17/04; B61D 17/045; E06B 5/00; E06B 3/26301
USPC .................. 52/782.11; 105/401, 399, 358
See application file for complete search history.

(56) References Cited

U.S. PATENT DOCUMENTS

| 2,145,403 | A | * | 1/1939 | Nemec | .................. | B61D 19/02 16/91 |
| 2,344,222 | A | * | 3/1944 | Trautvetter | ............ | B61D 19/02 52/204.593 |

(Continued)

FOREIGN PATENT DOCUMENTS

| AT | 412271 B | 12/2004 | | |
| DE | 19723740 A1 | * | 12/1998 | ................. B60J 5/00 |

(Continued)

OTHER PUBLICATIONS

Search Report for International Patent Application No. PCT/EP2014/051858; Jun. 20, 2014.

*Primary Examiner* — Joshua J Michener
*Assistant Examiner* — Keith Minter
(74) *Attorney, Agent, or Firm* — Barnes & Thornburg LLP

(57) ABSTRACT

A door leaf for a vehicle, in particular for a rail vehicle. The door leaf includes a door leaf frame for supporting a first shell, which is or can be arranged on a first main surface of the door leaf frame, and a second shell, which is or can be arranged on a second main surface of the door leaf frame opposite the first main surface. The door leaf has at least one connecting piece for thermally decoupling the first shell from the second shell, the connecting piece is or can be arranged or arrangeable on the door leaf frame. The at least one connecting piece is or can be arranged on the door leaf frame so the first shell and the second shell are movable relative to each other in at least one section of movement as a result of temperature variations.

12 Claims, 2 Drawing Sheets

(51) Int. Cl.
  *B60J 5/06* (2006.01)
  *E06B 3/263* (2006.01)
  *E06B 5/00* (2006.01)

(56) References Cited

U.S. PATENT DOCUMENTS

| | | | | |
|---|---|---|---|---|
| 2,405,793 A * | 8/1946 | Lohse | ............... | B61D 17/04 |
| | | | | 105/401 |
| 2,619,045 A * | 11/1952 | Dean | ............... | B61D 17/045 |
| | | | | 105/399 |
| 2,811,115 A * | 10/1957 | Dietrichson | ......... | B61D 5/002 |
| | | | | 105/358 |
| 2,911,933 A * | 11/1959 | Martin | ............... | B61D 17/045 |
| | | | | 269/22 |
| 5,109,777 A * | 5/1992 | Ohmura | ............. | B61D 17/04 |
| | | | | 105/401 |
| 6,279,287 B1 * | 8/2001 | Meadows | ............. | E04C 2/296 |
| | | | | 52/309.9 |
| 8,826,616 B1 * | 9/2014 | Gosselin | ............... | E06B 3/9616 |
| | | | | 52/204.5 |
| 2003/0159376 A1 * | 8/2003 | Huynh | ............. | E06B 5/00 |
| | | | | 52/208 |
| 2011/0100670 A1 * | 5/2011 | Matsumoto | ............. | C03C 27/06 |
| | | | | 174/50.5 |

FOREIGN PATENT DOCUMENTS

| | | | | |
|---|---|---|---|---|
| DE | 19732986 A1 * | 2/1999 | ......... | E04F 11/1851 |
| DE | CA 2395496 A1 * | 7/2001 | ......... | E06B 3/26301 |
| DE | 102007062528 A1 * | 6/2009 | ......... | B61D 19/02 |
| DE | 102008021224 A1 * | 11/2009 | ......... | B61D 19/02 |
| DE | 102012102514 A1 | 9/2012 | | |
| DE | 102012002139 A1 | 1/2013 | | |
| EP | 0357811 A1 | 3/1990 | | |
| FR | WO 9201179 A1 * | 1/1992 | ......... | B60J 10/0037 |
| JP | 2007303112 A | 11/2007 | | |
| NL | CA 2267866 A1 * | 10/1999 | ......... | B60J 9/00 |
| WO | 2014026211 A1 | 2/2014 | | |
| WO | WO 2014118292 A1 * | 8/2014 | ......... | B61D 19/02 |

* cited by examiner

DOOR LEAF FOR A VEHICLE, PARTICULARLY A RAIL VEHICLE

PRIORITY CLAIM

This patent application is a U.S. National Phase of International Patent Application No. PCT/EP2014/051828, filed 30 Jan. 2014, which claims priority to German Patent Application No. 10 2013 100 977.8, filed 31 Jan. 2013, the disclosures of which are incorporated herein by reference in their entirety.

FIELD

Disclosed embodiments relate to a door leaf for a vehicle, in particular for a rail vehicle.

BACKGROUND

Customary technology for a frame construction of a door leaf for the rail vehicle sector is based in particular on an aluminum or steel frame which is covered on the outer side and inner side with a metal sheet. For example, the door leaf consists of two transverse profiles, which are arranged at the top and bottom, and two longitudinal profiles which form the rear edge and the front edge. In conventional door leaf structures without thermal decoupling, sagging or deformation of the door leaf due to thermal stresses because of a difference in temperature between the inner side and outer side of, for example, up to +/−60° C. is negligible since such door leaves are thermally coupled, for example, directly via continuous profiles, for example aluminum profiles, or profiles which are not thermally decoupled, and therefore there is a very small difference in temperature between the individual shells. However, because of the increasing market requirements from the thermal insulation and/or sound insulation sector, it is increasingly more important to thermally decouple the supporting frame structure. Due to the poor thermal insulation of existing systems, condensation water may form in the inner region of the door leaf, in particular on entry doors during winter operation, thus permitting mold to form in the passenger region.

Disclosed embodiments provide an improved door leaf for a vehicle, in particular for a rail vehicle.

BRIEF DESCRIPTION OF THE FIGURES

Disclosed embodiments are explained in more detail below with reference to the attached drawings, in which.

DETAILED DESCRIPTION OF THE DISCLOSED EMBODIMENTS

Figure 1:
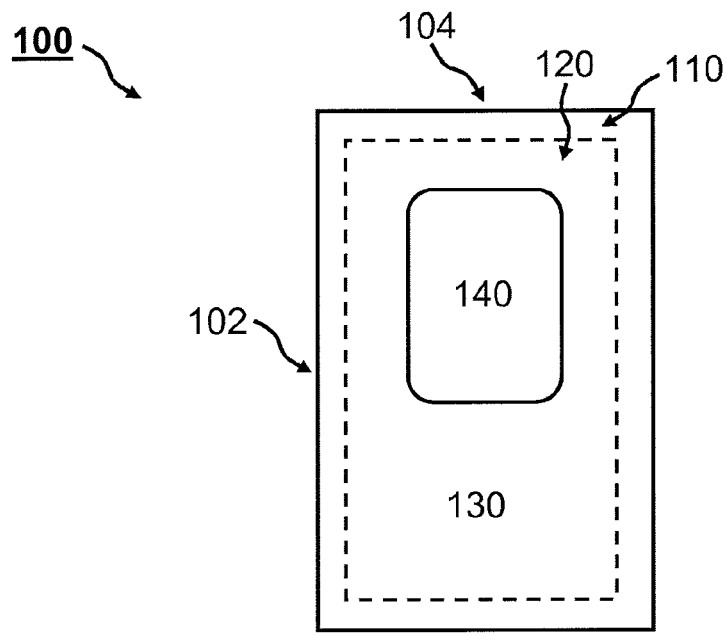
FIG. 1 shows a schematic illustration of a door leaf according to an exemplary embodiment.

Disclosed embodiments provide thermal and acoustic decoupling of the door outer wall from the door inner wall, which are connected via a supporting frame structure, and also a partially thermally induced displaceability of door outer wall and door inner wall. Therefore, in conjunction with use of thermally decoupled profiles, a partial displaceability of two shells or of outer shell and inner shell of a door leaf sandwich construction can be provided. The two shells for door outer wall and door inner wall are partially displaceable with respect to each other and partially non-displaceable. There is a possibility here to configure decoupling webs of the profiles in terms of length so as to be displaceable with respect to the shells in a certain region and not to be displaceable with respect thereto in another region. According to disclosed embodiments, the use of the thermal decoupling or of the decoupled profiles can be made possible while maintaining system limits of a mechanical deformation of the door leaf, in particular for an entry door of rail vehicles.

By a structure of a door leaf as per the approach presented here, in addition to a high thermal insulation effect and optionally good insulation effect with respect to the transmission of sound, a partial or locally limited displaceability of door outer wall and door inner wall can also be made possible. In particular, according to disclosed embodiments, an optimum or optimal compensation between thermally induced deformation of the door leaf because of a differential temperature on the outer side and inner side of the door leaf and stability in relation to load-induced sagging can be obtained. Frame parameters, such as weight, door leaf thickness and sealing stroke can be taken into consideration here. Thermal decoupling is advantageous in particular in the case of rail vehicle doors which are sometimes exposed to a very cold external environment when traveling over free terrain, especially in winter, and energy costs for the heating of the passenger compartment can be saved by the good thermal insulation properties. At the same time, pronounced travel noises arising during very rapid travel of the vehicle on the outer surface can be readily insulated in relation to penetrating the passenger compartment.

By the use of the thermal decoupling, in particular in the supporting system components of the door leaf, such as, for example, in the profiles and/or the door leaf frame, in the event of a differential temperature between outside and inside region, i.e. between the ambient temperature in the vehicle and outside temperature outside the vehicle, or by heating of the outer shell due to insolation in the region of the entry system, the difference in temperature may occur between inner shell and outer shell. As a result, different temperature-induced geometrical changes, such as, for example, changes in length to individual components of the door leaf system, may arise, and therefore a curvature of the door leaf may occur due to stresses. Without the provision of the displaceability according to disclosed embodiments, this curvature may lead, for example, to a deterioration in the sealing quality of the door leaf or of the entry system, but even to jamming of the entry system. In addition, an additional load may occur due to forces on the entry system. A lack of system tightness or sealing leakage due to a curvature of the door leaf because of differences in temperature and optionally additional loads, caused by, for example, pressure fluctuations on the outer side or inner side of the door leaf, which pressure fluctuations form in a force component acting on the door leaf depending on the area of the door leaf, can therefore be prevented according to disclosed embodiments.

According to disclosed embodiments, such a curvature of the door leaf can be prevented by the two shells, i.e. outer shell and inner shell, or the profiles being able to be displaced relative to each other by means of displaceable decoupling webs. By means of the merely partial displacement of the shells with respect to each other a rigidity of an overall assembly of the door leaf, in particular of a supporting structure of the door leaf, is very substantially maintained. For example, according to disclosed embodiments, a permissible range of the temperature-induced and load-induced curvature, which range is limited by a defined tightness of the entry system, which can be defined in a standard, is maintained. It is therefore possible to achieve a permissible range or an optimum between heat-induced curvature and load-induced sagging in an application-specific manner with respect to heat insulation, costs, weight, sound insulation, overall size and/or recesses. This permissible range can be achieved in that the shells can be displaced with respect to each other in a partial region of the door leaf, which brings about a reduction in the thermally induced curvature, and are not displaceable in another partial region, which brings about an increase in the rigidity of the door leaf and therefore a reduction in the limitation of the load-induced sagging. The thermally induced and load-induced curvature of the door leaf can be improved by increasing the rigidity of one of the two shells. This is possible firstly by means of an increase in the geometrical moment of inertia of the profile shell, or, secondly, by attaching an additional profile to the shell, wherein the additional stiffening profile does not bring about any direct thermal coupling to the other shell.

Disclosed embodiments provide a door leaf for a vehicle, in particular for a rail vehicle, wherein the door leaf has a door leaf frame for supporting a first shell, which is arrangeable or is arranged on a first main surface of the door leaf frame, and a second shell, which is arrangeable or is arranged on a second main surface of the door leaf frame opposite the first main surface, wherein the door leaf has at least one decoupling web, which is arrangeable or is arranged on the door leaf frame, for thermally decoupling the first shell and the second shell, wherein the at least one decoupling web is arrangeable or is arranged on the door leaf frame in such a manner that the first shell and the second shell are displaceable relative to each other in at least one displacement region of the door leaf, in particular in a thermally induced manner.

The vehicle can be a rail vehicle. A rail vehicle can be understood as meaning, in general, a rail-borne vehicle, such as a locomotive, a trainset, a rail car, a tram, a subway vehicle, or a car, such as a passenger car and/or freight car. The rail vehicle here can generally have at least one door with at least one door leaf. A door leaf can also be referred to as a door wing. A door leaf can have a door leaf frame which is covered with at least one shell. A shell can also be understood as meaning a sheet, an outer sheet, an inner sheet, a metal sheet, a glass window and/or a surface material. One of the two shells can be an outer shell and the other of the two shells can be an inner shell. In the installed state of the door leaf, the outer shell here can face an outer region or a surroundings of the vehicle and can be exposed to a temperature of the outer regional surroundings of the vehicle. In the installed state of the door leaf, the inner shell here can face an inner region, for example, a passenger compartment, of the vehicle and can be exposed to a temperature of an inner region, for example a passenger compartment, of the vehicle. It can be assumed that the shells approach that temperature or receive that temperature to which they are exposed according to the specification. The at least one decoupling web can be designed to bring about a thermal decoupling and optionally an acoustic decoupling of the first shell and of the second shell from each other. The at least one decoupling web can be formed from a material with low heat conductivity, for example lower heat conductivity than that of the shells. The at least one displacement region of the door leaf can have a partial region of at least one shell, in which partial region a thermally induced displacement or expansion or contraction can take place. The first shell and the second shell can be displaceable in a thermally induced manner and relative to each other with respect to the main claims of extent thereof, in particular along same or transversely with respect to same. The thermally induced displacement of the first shell and of the second shell relative to each other can also comprise a curvature of the first shell and of the second shell relative to each other.

According to a disclosed embodiment, the first shell and the second shell are displaceable within the at least one displacement region with respect to the at least one decoupling web. The first shell and the second shell can also be fixed outside the at least one displacement region with respect to the at least one decoupling web. The at least one decoupling web can be mechanically connected here directly or indirectly to the first shell and, in addition or alternatively, to the second shell. Within the at least one displacement region, the at least one decoupling web can be connected by means of a frictional connection to the first shell and, additionally or alternatively, to the second shell, or can be arranged loosely or in an unconnected manner between the shells. Outside the at least one displacement region, the at least one decoupling web can be connected by means of a form-fitting connection and, additionally or alternatively, a frictional connection and, additionally or alternatively, an integrally bonded connection to the first shell and the second shell. Such a disclosed embodiment affords the advantage that the partial displaceability of the shells can be achieved in a simple manner. In addition, stability of the door leaf can be maintained and a thermal decoupling of the door leaf, with thermal stresses in the door leaf reduced or eliminated, can be achieved.

The at least one decoupling web can also be arrangeable or arranged on the door leaf frame in such a manner that the first shell and the second shell are displaceable relative to each other in the at least one displacement region along a longitudinal axis of extent of the door leaf and, additionally or alternatively, along a transverse axis of extent of the door leaf. Such a disclosed embodiment affords the advantage that thermal, relative changes in length between outer shell and inner shell, which may arise in the door leaf because of a difference in temperature between vehicle outer side and vehicle inner side, and which occur in the advantageously obtained thermal decoupling, can be better and more flexibly absorbed.

In particular, the first shell and the second shell are displaceable relative to each other along the at least one decoupling web during a displacement along a longitudinal axis of extent of the door leaf. Furthermore the first shell and the second shell are displaceable relative to each other transversely with respect to the at least one decoupling web during a displacement along a transverse axis of extent of the door leaf. In the event of the displacement along the transverse axis of extent of the door leaf and transversely with respect to the at least one decoupling web, the at least one decoupling web can be designed to be tiltable or rotatable in a partial section of the longitudinal extent thereof about the longitudinal axis of extent thereof. Such a disclosed embodiment affords the advantage that the partial displaceability of the shells can also be realized in a simple manner along two displacement axes, in particular with one and the same type of decoupling webs.

According to at least one disclosed embodiment, at least one longitudinal decoupling web, which is arrangeable or is arranged along a long side edge of the door leaf, and at least one transverse decoupling web, which is arrangeable or is arranged along a narrow side edge of the door leaf, can be provided. The at least one longitudinal decoupling web can be arrangeable or arranged parallel to the long side edge of the door leaf within manufacturing tolerances. The at least one transverse decoupling web can be arrangeable or arranged parallel to the narrow side edge of the door leaf within manufacturing tolerances. Decoupling webs can therefore be arrangeable or arranged in particular along all side edges of the door leaf. Such a disclosed embodiment affords the advantage that thermal stresses occurring in the case of the advantageously obtained thermal decoupling and which may arise in the door leaf because of a difference in temperature between vehicle outer side and vehicle inner side, can be dissipated even better and more flexibly.

The at least one longitudinal decoupling web can be arrangeable or arranged here on the door leaf frame in such a manner that the first shell and the second shell are displaceable relative to each other along the at least one longitudinal decoupling web. The at least one transverse decoupling web can also be arrangeable or arranged on the door leaf frame in such a manner that the first shell and the second shell are displaceable relative to each other transversely with respect to the at least one transverse decoupling web. One possible construction of the door leaf consists in particular in that the shells are longitudinally displaceable by means of at least one longitudinal decoupling web on the longitudinal side and by means of at least one tiltable transverse decoupling web on the lower narrow side. Such a disclosed embodiment affords the advantage that the partial displaceability of the shells along the longitudinal axis of extent of the door leaf can be achieved both by means of longitudinal decoupling webs and by means of transverse decoupling webs in an advantageous combination. In particular, stability of the door leaf can also be maintained here and thermal decoupling of the door leaf with thermal stresses being reduced or eliminated can be achieved.

In particular, the door leaf frame can have at least one profile with a first profile part for the attaching of the first shell and with a second profile part for the attaching of the second shell. The at least one decoupling web can be arrangeable or arranged between the first profile part and the second profile part. The first shell can be connected to the first profile part and the second shell to the second profile part. The two profile parts and the decoupling web arranged between the two profile parts can form a profile. The decoupling web can be designed to thermally and optionally acoustically decouple the first profile part from the second profile part. With the decoupling web which is arrangeable or is arranged between the two profile parts, the profile part can be designed as a thermally decoupled profile. A profile can be understood as meaning a construction profile. A profile can have an identical cross section over the entire length thereof or a first cross section in the displacement region of the door leaf and a second cross section outside the displacement region of the door leaf. For the attaching of the shells, a profile can furthermore have grooves or the like. Further grooves for receiving sealing elements for sealing the door leaf to a vehicle body can also be provided. A sealing element can be understood as meaning, inter alia, a seal made of rubber and/or caoutchouc. In particular, the door leaf frame can have at least one profile as a transverse profile and at least one profile as a longitudinal profile. The door leaf frame can have a first transverse profile, a second transverse profile and a first longitudinal profile and a second longitudinal profile. In the case of a door leaf frame constructed of, for example, four profiles, the profiles can be screwed, welded and/or clamped. Furthermore, there is also the possibility of not connecting the profiles directly to each other, wherein the frame arises only after the individual profiles are connected to the sheet. A disclosed embodiment with a door leaf frame affords the advantage that a very stable and nevertheless partially flexible or displaceable mounting for the first and the second shell can be realized with the shells being thermally decoupled. The partial displaceability or flexibility of the shells relative to each other can advantageously be realized via the longitudinal displaceability of the shells and profiles by means of the decoupling webs. Furthermore, the shells and profiles can be connectable or connected, for example, in such a manner that tilting of the decoupling webs provided for the connection of the profile shells is thereby made possible when one shell is displaced transversely with respect to the longitudinal axis relative to the other shell and therefore an advantageous partial flexibility for dissipating thermal stresses or thermally induced relative changes in length is achieved. The profiles in which the decoupling webs are incorporated and which are located in the closer vicinity of the decoupling webs can be configured in such a manner that the decoupling webs can move longitudinally with respect to a main direction of displacement or longitudinal direction of extent of the door leaf and can also tilt transversely with respect thereto in the event of changes in temperature.

In this connection, the at least one profile can have a transverse profile, which is arrangeable or is arranged along a narrow side edge of the door leaf. At least one of the shells here can be arrangeable or arranged in a mechanically decoupled manner from the transverse profile. At least one profile of the door leaf frame can therefore be formed as a transverse profile. In particular, an outer sheet, which can be part of the first shell or can constitute the first shell, and/or an inner sheet, which can be part of the second shell or can constitute the second shell, can be arrangeable or arranged in a manner decoupled mechanically from the transverse profile. In a manner decoupled mechanically can mean here a mechanical bearing of the shells against the transverse profile and/or at least one decoupling web in the region of the transverse profile. Such a disclosed embodiment affords the advantage that a mounting, which is displaceable in particular along the longitudinal axis of the door leaf, for the first and the second shell can be realized with the shells being thermally decoupled.

The door leaf frame can also have an outer frame and a window frame, which is surrounded by the outer frame and is arrangeable or is arranged at a distance therefrom, for receiving a window in the door leaf. The window frame can be constructed here so as to correspond at least partially to the outer frame. The outer frame can be arrangeable or arranged in the region of the long side edges and narrow side edges of the door leaf. In particular, at least one decoupling web for the thermal decoupling of the first shell and of the second shell can also be provided on the window frame. Such a disclosed embodiment affords the advantage that a mounting, which is also displaceable in the region of a window frame of the door leaf, can be realized for the first and the second shell, with the shells being thermally decoupled. This can be achieved by a similar or corresponding design of outer frame and window frame and a similar or corresponding coupling of the shells to outer frame and window frame.

Furthermore, a filling material can be arrangeable or arranged between the first shell and the second shell in such a manner that the first shell and the second shell are displaceable in a thermally induced manner relative to each other in the at least one displacement region of the door leaf. In particular, the filling material can be arrangeable or arranged in a region enclosed by the door leaf frame or sandwich region between the first shell and the second shell. In particular, the filling material can have lower heat conductivity than a metal, in particular lower heat conductivity than aluminum. A filling material can be understood as meaning an insulating material and/or insulation material. The filling material may be framed. In particular, air can partially be enclosed in such formed filling material, wherein the air has lower heat conductivity than solid bodies and can improve or bring about a heat-insulating property of the filling material. Such a disclosed embodiment affords the advantage that the filling material in the sandwich region of the door leaf can provide a further thermal and optionally acoustic insulation for the door leaf and can be designed and/or arranged here in such a manner that the partial displaceability or flexibility is maintained.

A shear modulus of the filling material here can enable the first shell and the second shell to be displaceable relative to each other in a thermally induced manner in the at least one displacement region of the door leaf. In particular, the modulus of the filling material can be selected to be particularly low. There is therefore the possibility of selecting the filling material of the sandwich region to be of low shear resistance per se in such a manner that the filling material does not adversely affect the partial displaceability of the shells despite connection of the filling material to the two shells and optionally also cannot apply any forces which may result in a curvature of the door leaf.

Alternatively, the filling material can be arrangeable or arranged in the at least one displacement region of the door leaf in a manner decoupled mechanically from the first shell and/or the second shell. At least one of the two shells here is arranged at least partially, or in the at least one displacement region, so as to be spaced apart from the filling material or so as merely to bear loosely against the filling material. Such a disclosed embodiment affords the advantage that even a material which has greater shear resistance or a material with a higher shear modulus, such as, for example, polyurethane foam or the like, can be used as filling material without adversely affecting the partial displaceability of the shells. A disclosed foamed embodiment would otherwise not be possible because of the high shear resistance of the existing foam material and the connection, which is a direct connection because of the foaming process, between inner shell and outer shell. Conditions or properties suitable for a sandwich/core design of this type can therefore be provided.

In particular, the first shell and the second shell can be connectable or connected to each other in such a manner that the first shell and the second shell are displaceable with respect to each other with a defined application of force. In this connection, after a thermally induced or load-induced, defined curvature and a resultingly impressed shear force, the first shell and the second shell can be displaced with respect to each other, wherein static friction is overcome. This can take place partially or over the entire door leaf in this manner.

In the description below of the disclosed embodiments, identical or similar reference numbers are used for the elements of similar effect illustrated in the various drawings, with repeated description of the elements being omitted.

FIG. 1 shows a schematic illustration of a door leaf 100 according to an exemplary embodiment. The door leaf 100 can be provided for a vehicle, in particular for a rail vehicle. A long side edge 102 of the door leaf 100, a narrow side edge 104 of the door leaf 100, a door leaf frame 110 or a region of a door leaf frame, a sandwich region 120 or a region enclosed by the door leaf frame 110, an outer sheet 130 and a window 140 are shown.

The door leaf 100 has, by way of example, a rectangular outline which is spanned by the long side edge 102 and the narrow side edge 104. The long side edge 102 can run along a longitudinal axis extent of the door leaf 100. The narrow side edge 104 can run along a transverse axis of extent of the door leaf 100. The illustration in FIG. 1 shows a top view of the outer sheet 130 of the door leaf 100. The outer sheet 130 has a recess within which the window 140 is arranged. The window 140 can also be arranged at a later point in the recess of the outer region 130.

The door leaf 100 has, inter alia, the door leaf frame 110, which is delimited from the sandwich region 120, as indicated by a dashed line in FIG. 1, and an outer shell or forced shell, to which the outer sheet 130 belongs, and an inner shell or second shell, even though not explicitly shown in FIG. 1. The shells are attached to the door leaf frame 110 with a door leaf 100 already fitted. The two shells are thermally decoupled and optionally decoupled acoustically from each other by means of at least one decoupling web, even though not illustrated in FIG. 1.

The door leaf frame 110 extends in a main plane of extent of the door leaf 100 which corresponds in FIG. 1 by way of example to the plane of projection. The door leaf frame 110 is joined together, for example from four profiles. One of the profiles in each case extends here along a respective side edge of the door leaf 100.

The sandwich region 120 of the door leaf 100 is completely or at least partially enclosed in the main plane of extent of the door leaf 100 by the door leaf frame 110. The window 140 is recessed from the region 120. In the sandwich region 120, the door leaf 100 is filled, for example, with a filling material in an intermediate space between the outer shell and the inner shell.

Figure 2:
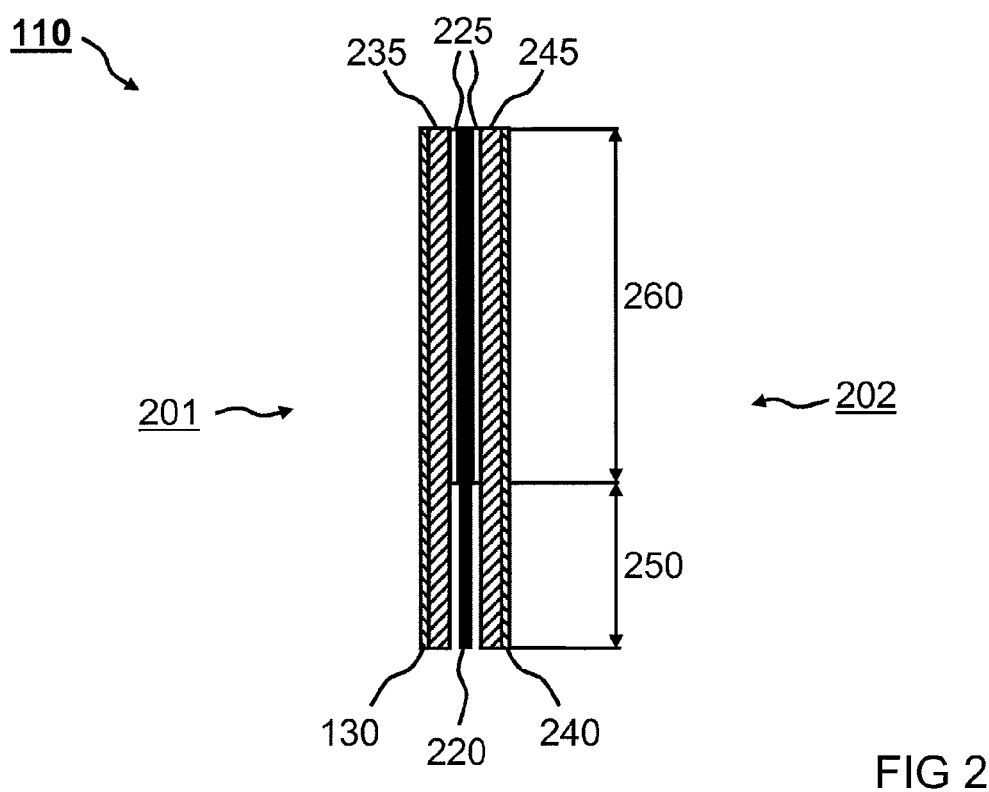
FIGS. 2-5 show schematic sectional illustrations of the door leaf frame or of partial sections of the door leaf frame of the door leaf shown in FIG. 1.

FIG. 2 shows a schematic sectional illustration of a partial section of the door leaf frame 110 of the door leaf, which is shown in FIG. 1, according to an exemplary embodiment. To arrive at the illustration in FIG. 2, the door leaf from FIG. 1 is sectioned, for example, in the region of the door leaf frame 110 along one of the long side edges illustrated in FIG. 1. The partial section of the door leaf frame 110 that is shown in the schematic sectional illustration in FIG. 2 extends here at least partially along or parallel to one of the long side edges.

The outer sheet 130, a first shell or outer shell 201, a second shell or inner shell 202, a decoupling web 220, a blocking device 225, a profile outer shell 235, an inner sheet 240, a profile inner shell 245, a displacement region 250 and a blocking region 260 of displaceability are shown in FIG. 2. The outer shell 201 has the outer sheet 130, wherein the profile outer shell 235 is part of the door leaf frame 110 and serves for fastening the outer shell 201. The inner shell 202 has the inner sheet 240, wherein the profile inner shell 245 is part of the door leaf frame 110 and serves for fastening the inner shell 202. The decoupling web 220 and the blocking device 225 are arranged between the outer shell 201 and the inner shell 202. The decoupling web 220 extends, for example, along or parallel to that long side edge of the door leaf which is shown in FIG. 1. The decoupling web 220 is designed thermally and optionally also acoustically to decouple the outer shell 201 and the inner shell 202 from each other.

In the displacement region 250 of the door leaf, the decoupling web 220 is arranged between the profile outer shell 235 and the profile inner shell 245. The profile outer shell 235 is arranged here between the outer sheet 130 and the decoupling web 220, and the profile inner shell 245 is arranged between the inner sheet 240 and the decoupling web 220. In the displacement region 250, the outer shell 201 and the inner shell 202 are displaceable with respect to each other because of thermally induced, differing expansion or contraction. The displacement region 250 is therefore a region in which the outer shell 201 and the inner shell 202 are displaceable relative to each other.

In the displacement region 250, the decoupling web 220 is connected in a form-fitting and/or frictional manner to the profile outer shell 235 and the profile inner shell 245, or is arranged spaced apart from same, to permit the displaceability of the outer shell 201 and the inner shell 202. According to the exemplary embodiment, which is shown in FIG. 2, the decoupling web 220, in the sectional view illustrated in FIG. 2, is arranged in the displacement region 250 in a manner spaced apart from the profile outer shell 235 and the profile inner shell 245 by means of respective intermediate spaces. Alternatively, the decoupling web 220, according to another exemplary embodiment, can also be arranged in the displacement region 250 in a manner bearing against the profile outer shell 235 and/or the profile inner shell 245.

In the blocking region 260 of the door leaf, the decoupling web 220 is arranged between a first section and a second section of the blocking device 225. The blocking device 225 can be connected, for example, to the outer shell 201 and the inner shell 202, or can be formed by a partial section of the outer shell 201 and a partial section of the inner shell 202. The profile outer shell 235 is arranged here between the outer sheet 130 and the first section of the blocking device 225, and the profile inner shell 245 is arranged between the inner sheet 240 in the second section of the blocking device 225. The blocking region 260 is therefore a region in which the outer shell 201 and the inner shell 202 are substantially undisplaceable relative to each other.

The decoupling web 220 is connected in the blocking region 260 to the outer shell 201 and the inner shell 202, for example, in a form-fitting and/or frictional and/or integrally bonded manner. For example, the decoupling web 220 is connected in the blocking region 260 to the outer shell 201 and the inner shell 202 by means of the blocking device 224 or to the profile outer shell 235 and the profile inner shell 245. Temperature-induced displaceability of the outer shell 201 and of the inner shell 202 relative to each other is therefore reduced or prevented in the blocking region.

Figure 3:
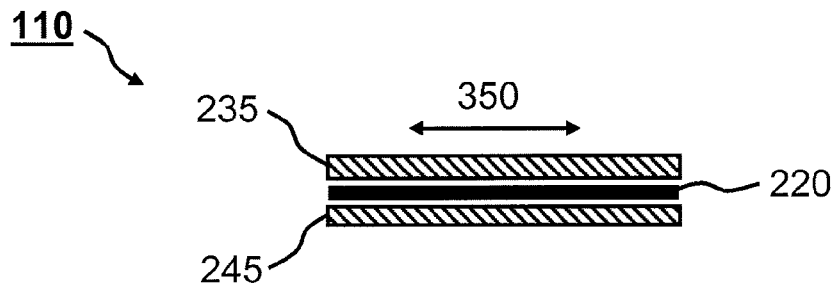

FIG. 3 shows a schematic sectional illustration of a partial section of the door leaf frame 110 of the door leaf, which is shown in FIG. 1, according to an exemplary embodiment. The sectional illustration in FIG. 3 shows a cutout of the door leaf frame 110 shown in FIG. 2, in the displacement region. The decoupling web 220 and the profile outer shell 235 and the profile inner shell 245 as profile shells are shown. The decoupling web 220 is arranged between the profile outer shell 235 and the profile inner shell 245, as illustrated in the displacement region in FIG. 2.

Furthermore, a two-directional arrow symbolically shows a longitudinal displacement 350 of the profile shells, along the long side edge, illustrated in FIG. 1, of the door leaf. The longitudinal displacement 350 is in particular thermally induced. In the case of the longitudinal displacement 350, the profile outer shell 235 and the profile inner shell 245 are displaceable with respect to each other. In particular, the profile outer shell 235 and the profile inner shell 245 are displaceable here relative to each other along a longitudinal axis of extent of the decoupling web 220. For example, the profile outer shell 235 and/or the profile inner shell 245 are also displaceable here with respect to the decoupling web 220.

Figure 4:
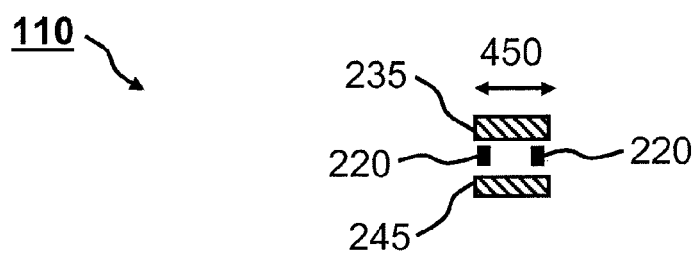

FIG. 4 shows a schematic sectional illustration of a partial section of the door leaf frame 110 of the door leaf shown in FIG. 1, according to an exemplary embodiment. To arrive at the illustration in FIG. 4, the door leaf from FIG. 1 has been sectioned, for example, in the region of the door leaf frame 110 along or transversely with respect to one of the narrow side edges illustrated in FIG. 1. The partial section of the door leaf frame 110 shown in the schematic sectional illustration in FIG. 4 at least partially extends here along or parallel to one of the narrow side edges, in particular along the narrow side edge illustrated at the bottom in FIG. 1. For example, two decoupling webs 220 and the profile outer shell 235 and the profile inner shell 245 as profile shells are shown in an illustration-dependent manner. The decoupling webs 220 are arranged between the profile outer shell 235 and the profile inner shell 245. The decoupling webs 220 are shown in the cross-sectional profile thereof in FIG. 4 in an illustration-dependent manner.

Furthermore, a transverse displacement 450 of the profile shells along or transversely with respect to the narrow side edge of the door leaf illustrated in FIG. 1 is shown symbolically by a two-directional arrow. The transverse displacement 450 is in particular thermally induced. In the event of the transverse displacement 450, the profile outer shell 235 and the profile inner shell 245 are displaceable with respect to each other, wherein the decoupling webs 220 are designed to tilt during the transverse displacement 450. In particular, the profile outer shell 235 and the profile inner shell 245 are displaceable here relative to each other transversely with respect to a longitudinal axis of extent of the decoupling webs 220. For example, the profile outer shell 235 and/or the profile inner shell 245 are also displaceable here with respect to the decoupling webs 220.

Figure 5:
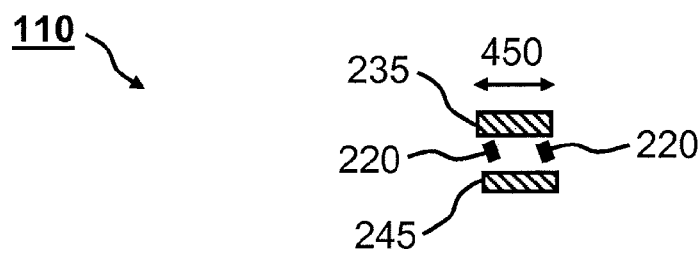

FIG. 5 shows a schematic sectional illustration of a partial section of the door leaf frame 110 of the door leaf shown in FIG. 1, according to an exemplary embodiment. The shell partial section of the door leaf frame 110 and the illustration in FIG. 5 correspond here to the partial section of the door leaf frame 110 and to the illustration from FIG. 4, with the exception that the profile outer shell 235 and the profile inner shell 245 are displaced relative to each other along the transverse displacement 450 or transverse displacement axis, wherein the decoupling webs 220 are tilted by the transverse displacement 450.

The exemplary embodiments described are selected merely by way of example and can be combined with one another.

Customary technology for a frame construction of a door leaf for the rail vehicle sector is based in particular on an aluminum or steel frame which is covered on the outer side and inner side with a metal sheet. For example, the door leaf consists of two transverse profiles, which are arranged at the top and bottom, and two longitudinal profiles which form the rear edge and the front edge. In conventional door leaf structures without thermal decoupling, sagging or deformation of the door leaf due to thermal stresses because of a difference in temperature between the inner side and outer side of, for example, up to +/−60° C. is negligible since such door leaves are thermally coupled, for example, directly via continuous profiles, for example aluminum profiles, or profiles which are not thermally decoupled, and therefore there is a very small difference in temperature between the individual shells. However, because of the increasing market requirements from the thermal insulation and/or sound insulation sector, it is increasingly more important to thermally decouple the supporting frame structure. Due to the poor thermal insulation of existing systems, condensation water may form in the inner region of the door leaf, in particular on entry doors during winter operation, thus permitting mold to form in the passenger region.

AT412271B discloses a door leaf for a rail vehicle, which door leaf consists of at least two painted sheets which are mounted on a door leaf frame arranged between the sheets.

LIST OF REFERENCE NUMBERS

100 Door leaf
102 Long side edge or longitudinal side of the door leaf
104 Narrow side edge or transverse side of the door leaf 110 Door leaf frame
120 Sandwich region
130 Outer sheet
140 Window
201 First shell or outer shell
202 Second shell or inner shell
220 Decoupling web
225 Blocking device
235 Profile outer shell
240 Inner sheet
245 Profile inner shell
250 Displacement region
260 Blocking region for displaceability
350 Longitudinal displacement
450 Transverse displacement

The invention claimed is:

1. A door leaf for a vehicle, the door leaf comprising:
a door leaf frame, wherein the door leaf frame supports the first shell which is arranged on a first main surface of the door leaf frame; and
a second shell, which is arranged on a second main surface of the door leaf frame opposite the first main surface,
wherein the door leaf has at least one decoupling web, which is arranged on the door leaf frame, for thermally decoupling the first shell and the second shell, wherein the at least one decoupling web is arranged on the door leaf frame so the first shell and the second shell are displaceable relative to each other in at least one displacement region of the door leaf,
wherein the decoupling web extends into the at least one displacement region, and
wherein the first shell and the second shell are displaceable within the at least one displacement region with respect to the at least one decoupling web and are fixed outside the at least one displacement region with respect to the at least one decoupling web.

2. The door leaf of claim 1, wherein the at least one decoupling web is arranged on the door leaf frame so the first shell and the second shell are displaceable relative to each other in the at least one displacement region along a longitudinal axis of extent of the door leaf or along a transverse axis of extent of the door leaf.

3. The door leaf of claim 1, wherein the first shell and the second shell are displaceable relative to each other along the at least one decoupling web during a displacement along a longitudinal axis of extent of the door leaf, and are displaceable relative to each other transversely with respect to the at least one decoupling web during a displacement along a transverse axis of extent of the door leaf.

4. The door leaf of claim 1, further comprising:
at least one longitudinal decoupling web, which is arranged along a long side edge of the door leaf; and
at least one transverse decoupling web, which is arranged along a narrow side edge of the door leaf.

5. The door leaf of claim 4, wherein the at least one longitudinal decoupling web is arranged on the door leaf frame so the first shell and the second shell are displaceable relative to each other along the at least one longitudinal decoupling web, and the at least one transverse decoupling web is arrangeable or is arranged on the door leaf frame so the first shell and the second shell are displaceable relative to each other transversely with respect to the at least one transverse decoupling web.

6. The door leaf of claim 1, wherein the door leaf frame has at least one profile with a first profile part for the attaching of the first shell and with a second profile part for the attaching of the second shell, wherein the at least one decoupling web is arranged between the first profile part and the second profile part.

7. The door leaf of claim 6, wherein the at least one profile has a transverse profile, which is arranged along a narrow side edge of the door leaf, wherein at least one of the shells is arrangeable or is arranged mechanically decoupled from the transverse profile.

8. The door leaf of claim 1, wherein the door leaf frame has an outer frame and a window frame, which is surrounded by the outer frame and is arranged at a distance therefrom, for receiving a window in the door leaf, wherein the window frame is constructed to correspond at least partially to the outer frame.

9. The door leaf of claim 1, wherein a filling material is arranged between the first shell and the second shell so the first shell and the second shell are displaceable relative to each other in the at least one displacement region of the door leaf.

10. The door leaf of claim 9, wherein a shear modulus of the filling material enables the first shell and the second shell to be displaceable relative to each other in the at least one displacement region of the door leaf.

11. The door leaf of claim 9, wherein the filling material is arranged in the at least one displacement region of the door leaf mechanically decoupled from the first shell and the second shell.

12. The door leaf of claim 1, wherein the first shell and the second shell are connectable or are connected to each other so the first shell and the second shell are displaceable with respect to each other with a defined application of force.

* * * * *